United States Patent [19]

Romagosa

[11] Patent Number: 4,734,882
[45] Date of Patent: Mar. 29, 1988

[54] MULTILEVEL INTERRUPT HANDLING SCHEME

[75] Inventor: Alfredo A. Romagosa, Ft. Lauderdale, Fla.

[73] Assignee: Harris Corp., Melbourne, Fla.

[21] Appl. No.: 718,272

[22] Filed: Apr. 1, 1985

[51] Int. Cl.$^4$ .............................................. G06F 9/00
[52] U.S. Cl. ..................................................... 364/900
[58] Field of Search .............................. 364/200, 900

[56] References Cited

U.S. PATENT DOCUMENTS

| | | | |
|---|---|---|---|
| 3,665,415 | 5/1972 | Beard et al. | 364/200 |
| 4,023,143 | 5/1977 | Braunstein | 364/200 |
| 4,096,564 | 6/1978 | Inose et al. | 364/200 |
| 4,181,941 | 1/1980 | Godsey | 364/200 |
| 4,291,371 | 9/1981 | Holtey | 364/200 |
| 4,349,873 | 9/1982 | Gunter et al. | 364/200 |
| 4,453,214 | 6/1984 | Adcock | 364/200 |
| 4,470,111 | 9/1984 | Jenkins et al. | 364/200 |

Primary Examiner—Gareth D. Shaw
Assistant Examiner—John G. Mills
Attorney, Agent, or Firm—Antonelli, Terry & Wands

[57] ABSTRACT

An interrupt request handling mechanism employs a portion of the address portion of the data processing system's communication bus. All interrupt requests to a processor are handled by an associated interrupt controller that is coupled between the prescribed address lines and the processor. As interrupt requests are received they are temporarily stored in memory. The storage locations of the memory are successively scanned, beginning with the memory address having the highest priority level and proceeding through successively lesser orders of priority locations until an interrupt request has been found. That located "highest" priority level interrupt request that is stored in memory is placed in a buffer register the contents of which are compared, on a continual basis, with the level of the task being executed by the processor. Upon the level of the task under execution by the processor falling below that associated with the contents of the buffer register, the interrupt controller couples the contents of the buffer register to the processor as an interrupt. When the processor acknowledges capture of the interrupt from the interrupt controller, the corresponding storage location in memory is erased.

12 Claims, 2 Drawing Figures

MULTILEVEL INTERRUPT HANDLING SCHEME

FIELD OF THE INVENTION

The present invention relates, in general, to data processing apparatus, and is particularly directed to a scheme for processing interrupt requests.

BACKGROUND OF THE INVENTION

In the course of executing data manipulation and transfer requests, a data processing system may receive one or more task assignments in response to which the system temporarily aborts a current exercise and turns its attention instead to a demand for its services that is considered by the processor to be of more critical importance. In order to prevent a conflict among these requests for service, or interrupts, each interrupt request is assigned a service preference according to a priority scheme that is designed to ensure that the most critical tasks are always serviced effectively immediately, while lesser important tasks, commonly termed background tasks, are serviced after the critical requests for service have been honored. Moreover, as the name 'interrupt' implies a request for processor service having a priority higher than that currently being processed will cause the processor to interrupt its current exercise and execute the task requested by the higher priority interrupt.

For implementing such a service request handling scheme, whether it be employed for intra or interprocessor interrupt handling, schemes containing dedicated interrupt lines associated with respective modules that may generate a request for service have been proposed. Priority among these dedicated interrupt lines is typically accomplished by way of a prescribed hardware architecture, through which a request on an interrupt line of relatively higher rank automatically locks out all requests of a lesser rank. More sophisticated priority architectures may include arbitration circuits through which all service requests are routed, the arbitration circuits prioritizing requests for service according to a predetermined assignment table. Because such interrupt handling approaches are typically hardware intensive and operationally rigid, in order to attain a fairly high degree of system performance (speed), they are constrained to limited applications, thereby restricting their adaptability to variable capacity, multiple capability processor architectures.

SUMMARY OF THE INVENTION

In accordance with the present invention there is provided an interrupt request handling mechanism that provides a greater degree of flexibility than the dedicated line architectures referenced above, while still offering significant performance (speed) when compared to more "globally"oriented approaches. Rather than incorporate a set of separate interrupt request lines for the respective units of the data processing system that may require processor service, the interrupt handling scheme of the present invention employs a portion of the address portion of the data processing system's communication bus. For an exemplary environment having a thirty-two bit address bus, a prescribed number (e.g. ten) of the address lines are employed for interrupt requests. Each unit or module that may generate an interrupt is provided with programmable registers for setting the priority level of one or more interrupt requests for that unit. When a module desires to transmit an interrupt request it does so through these assigned addresses.

All interrupt requests to a processor are handled by an associated interrupt controller that is coupled between the prescribed address lines and the processor. As interrupt requests are received they are temporarily (until honored by the processor) stored as flags in memory. For the ten bit wide assigned segment of the address portion of the communication bus of the present example, a memory one bit wide and 1K addresses deep may be employed. The storage locations of the memory are successively scanned, beginning with the memory address having the highest priority level and proceeding through successively lesser orders of priority locations until an interrupt request or flag has been found. That located "highest" priority level interrupt request that is stored in memory is placed in a buffer register the contents of which are compared, on a continual basis, with the level of the task being executed by the processor. Upon the level of the task under execution by the processor falling below that associated with the contents of the buffer register, the interrupt controller couples the contents of the buffer register to the processor as an interrupt. When the processor acknowledges capture of the interrupt from the interrupt controller, the corresponding storage location in memory is erased.

To ensure that the highest priority level interrupt request will always be honored above all others, regardless of the order of receipt of interrupt requests, scanning of the memory is always interrupted whenever a new interrupt request is placed in the buffer register. The sequential scan is subsequently resumed (after transfer of the contents of the buffer register to the processor) at the memory address associated with the transferred interrupt.

DETAILED DESCRIPTION

Figure 1:
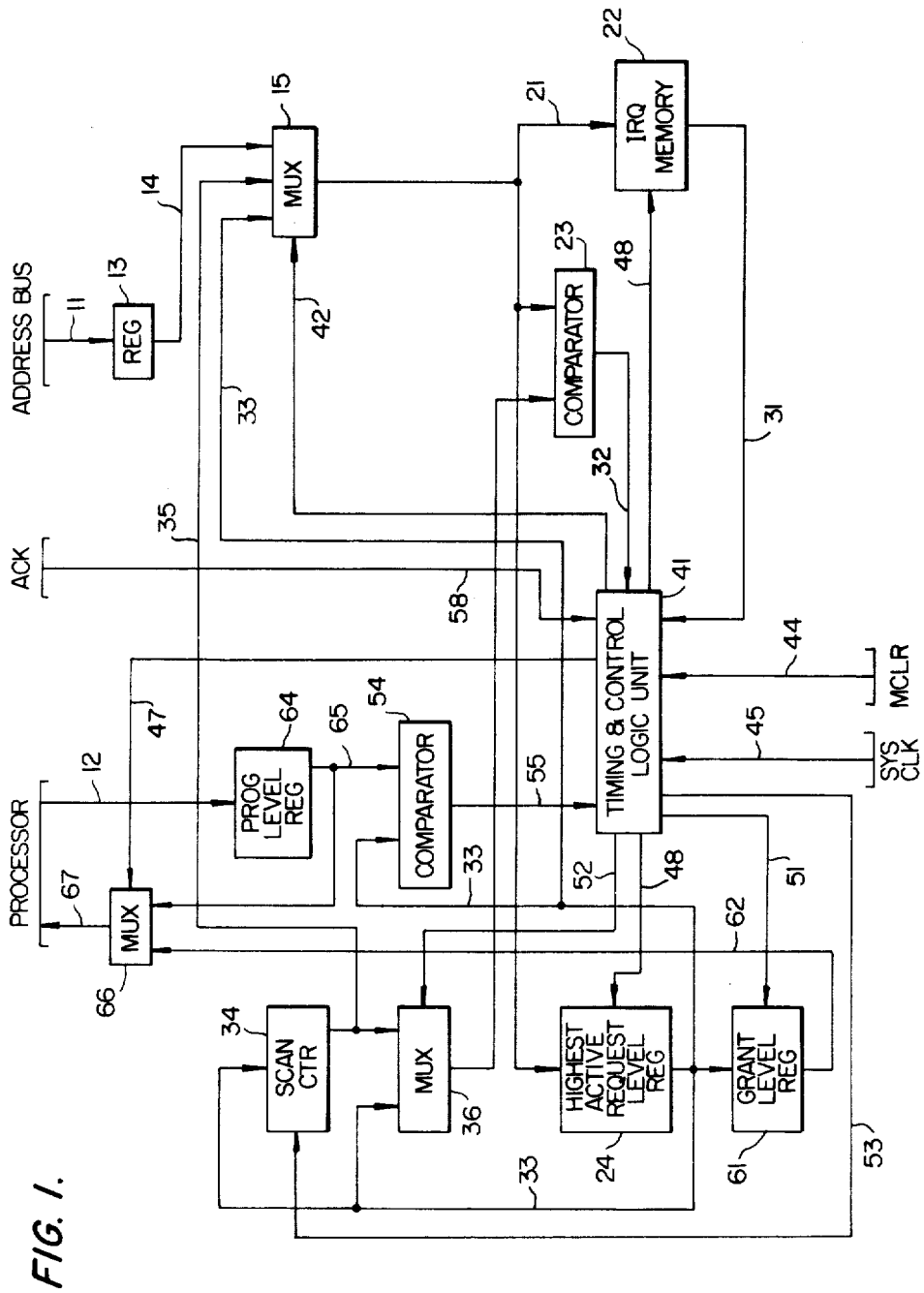
FIG. 1 is a schematic block diagram of an interrupt controller in accordance with the present invention.

Before describing, in detail, the particular improved interrupt handling scheme in accordance with the present invention, it should be observed that the invention resides primarily in a novel structural combination of conventional digital logic circuits and not in the particular detailed configurations thereof. Accordingly, the structure, control and arrangement of such conventional circuits have been illustrated in the Drawings by readily understandable schematic block representations, which show only those specific details that are pertinent to the present invention, in order not to obscure the disclosure with structural details that will be readily apparent to those skilled in the art having the benefit of the description herein. In addition, various portions of an electronic data processing system have been appropriately consolidated and simplified in order to emphasize those portions that are most pertinent to the present invention. Thus, the block diagram illustrations in the Drawings do not necessarily represent the mechanical structural arrangement of the exemplarily system, but are primarily intended to illustrate the major structural components of the system in a convenient functional grouping, whereby the present invention can be more readily understood.

Referring now to FIG. 1 of the Drawings, there is shown a schematic block diagram of a multi-level interrupt controller unit according to the present invention for use with an electronic data processing system for handling multi-level interrupts among the various modules of the system. As pointed out briefly above, rather than employ dedicated interrupt lines for each of the modules that are coupled to the processor (or processors in a multi processor system), the present invention employs a prescribed portion of the address bus for raising an interrupt. For purposes of describing an exemplarily embodiment, it will be assumed that the bus is sufficiently wide to accommodate up to 1K levels of interrupt. With present day computer architectures, for a 32 bit address bus, some number of the address lines, e.g. bits 22-31, may be assigned to this interrupt function. Preferably, within each unit or module that may request service from a processor, whether the system be a multi-processor system or within a single processor system, a dedicated register is associated with the prescribed portion of the address bus for indicating the priority level assigned to an interrupt request that may be generated by that particular unit or module. The contents of the register (in the present example 10 bits) are software configurable so that any unit or module may have its priority selectively assigned.

In order to raise an interrupt to the processor, the module of interest simply identifies its priority level on that portion of the address bus assigned for the interrupt function. (The manner in which an interrupt that has been raised by a unit is handled will be described in detail in conjunction with the description of the operation of the controller shown in FIG. 1 with reference to FIG. 2 to be subsequently described.)

As shown in to FIG. 1, that portion of the address bus (in the present example bits 22-31 of a 32 bit address bus) 11 over which an interrupt representative code (indicating the level of priority of the interrupt for the module of interest) is coupled to an address level register 13. In address level register 13, the contents the interrupt request representative portion of the address bus are temporarily buffered prior to be written into an interrupt flag memory 22 to be available for subsequent processing by the interrupt controller. The contents of the respective stages of address level register 13 are coupled over a link 14 to one input of a multi-bit, multi-input multiplexer 15. Multiplexer 15 has three multi-bit (ten in the present example) inputs, a first of which is connected over link 14 to the address level register 13, referenced above. A second input is coupled over input link 35 to a scan counter 34, the function of which is to step through the addresses (storage locations) of interrupt request memory 22, which is coupled to output link 21 of multiplexer 15. The third input of multiplexer 15 is coupled over link 33 to a highest active request level register 24, which stores the highest priority level of an interrupt that has been requested, but not yet honored by the processor, as will be explained in more detail below.

In addition to be coupled to interrupt request memory 22, link 21 at the output of request level multiplexer 15 is coupled to a comparator 23. Comparator 23 compares the contents of link 10 with the contents of a link 38 which is coupled to the output of a multiplexer 36. Multiplexer 36 couples either the output of the scan counter 34 or the output of the highest active request level register 24 to link 38, depending upon the state of operation of the interrupt controller, as will be described in more detail below. In effect, multiplexer 36 is controlled to couple the contents of the highest active request level register 24 to comparator 23 unless there has been no interrupt request located in the memory locations of memory 22 by the action of scan counter 34.

In addition to being coupled to one input of multiplexer 36 and one of the inputs of multiplexer 15, link 33, from the output of highest active request level register 24, is also coupled to a grant level register 61, to the preset input links of the register stages of counter 34 and to one input of a comparator 54. A second input of comparator 54 is coupled to the processor via a register 64. Grant level register 61 is employed to couple the interrupt request stored in the highest active request level register 24 to the processor for processing when comparator 54 detects that the level of the task that the processor is currently undertaking (stored in register 64) falls below that associated with the contents of highest active request level register 24.

The output of grant level register 61 is coupled over link 62 to one input of a multiplexer 66. Multiplexer 66 couples either the output of the grant level register 61 or the output of a program level register 64, which is coupled to interrupt input line 12, to an output interrupt line 67 to the processor. In effect, lines 12 and 67 are the input/output interrupt lines to and from the processor. The output of program level register 64, in addition to be coupled to the second input of multiplexer 66 over link 65, is coupled to comparator circuit 54. As mentioned previously, comparator circuit 54 continuously compares the level of the task being executed by the processor (as identified by the contents of the program level register 64) with the level of the interrupt, if any, identified by the contents of highest active request level register 24. As long as the level of the task being executed by the processor, as identified by the ten bit interrupt level representative code stored in program level register 64, is greater than the priority level of the interrupt code stored in highest active request level register 24, the output of comparator 54, coupled over link 55 to timing and control logic unit 41, remains unchanged, and the processor continues to execute its current task to completion. In response to a change in the contents of highest active request level register 24 yielding an interrupt code which represents a higher priority level than that of the task currently being executed by the processor and stored in register 64, the output of comparator 54 will change state, providing an interrupt transfer request signal over line 55 to timing and a control logic unit 41.

Timing and control logic unit 41 is comprised of combinational logic (which may include a suitably programmed PROM) for generating timing and control signals for operating the various components of the interrupt control unit shown in FIG. 1. Rather than describe the details of an implementation of timing and control unit 41, the explanation to follow will treat the input and output signals that are associated with timing and control unit 41 and their functions relative to the other components of the interrupt controller, in order not to burden the present description with details that will be readily understood and implementable by one skilled in the art. These timing and control signals are associated with the links coupling the timing and control unit 41 to the other components of the interrupt controller to be described below.

As pointed out above, the output of comparator 54 is coupled over link 55. In response to a change in the state of signal line 55, the logic circuitry within timing and control logic unit 41 provides an output over link 51 to grant level register 61, causing the contents of the highest active request level register 24 to be coupled to grant level register 61 for application over link 62 through multiplexer 66 to the processor. It also supplies a signal over line 47 to the switch control input of multiplexer 66, so that the output of the grant level register 61, as supplied over link 62, will be coupled over link 67 to the processor as a new interrupt vector. When that interrupt request is captured, the processor sends an acknowledge signal over line 58 and returns the interrupt level over line 12 to program level register 64. In response to the acknowledge signal on line 58, timing and control logic unit couples the interrupt code in highest active request register 24 through multiplexer 15 to address the corresponding storage location in memory 22, and via link 48, inverts, or erases, that addressed location, so as to clear that particular interrupt request from the memory 22.

Output line 42 from timing and control logic unit 41 is employed to selectively switch one of the input links 33, 35 and 14 to output link 21 of request level multiplexer 15. Output link 32 from comparator 23 supplies a signal to timing and control logic unit 41 when the code supplied over link 21 from multiplexer 15 is greater than that supplied from multiplexer 36 over link 38.

Link 31 from memory 22 supplies a signal representative of the presence or absence of an interrupt bit in the addressed location in memory 22 as identified by the contents of link 21. Input line 44 to logic unit 41 is a master clear input, while input link 45 provides system clock. Output line 52 is coupled to the select input of multiplexer 36 to control which input link (the contents of scan counter 34 or the contents of highest active request register 24) is coupled over line 38 to one input of comparator 23. Link 48 supplies a load enable signal to highest active request register 24 for causing register 24 to store the address code on link 21, while link 53 is used to control the presetting of the contents of scan counter 34.

OPERATION

Figure 2:
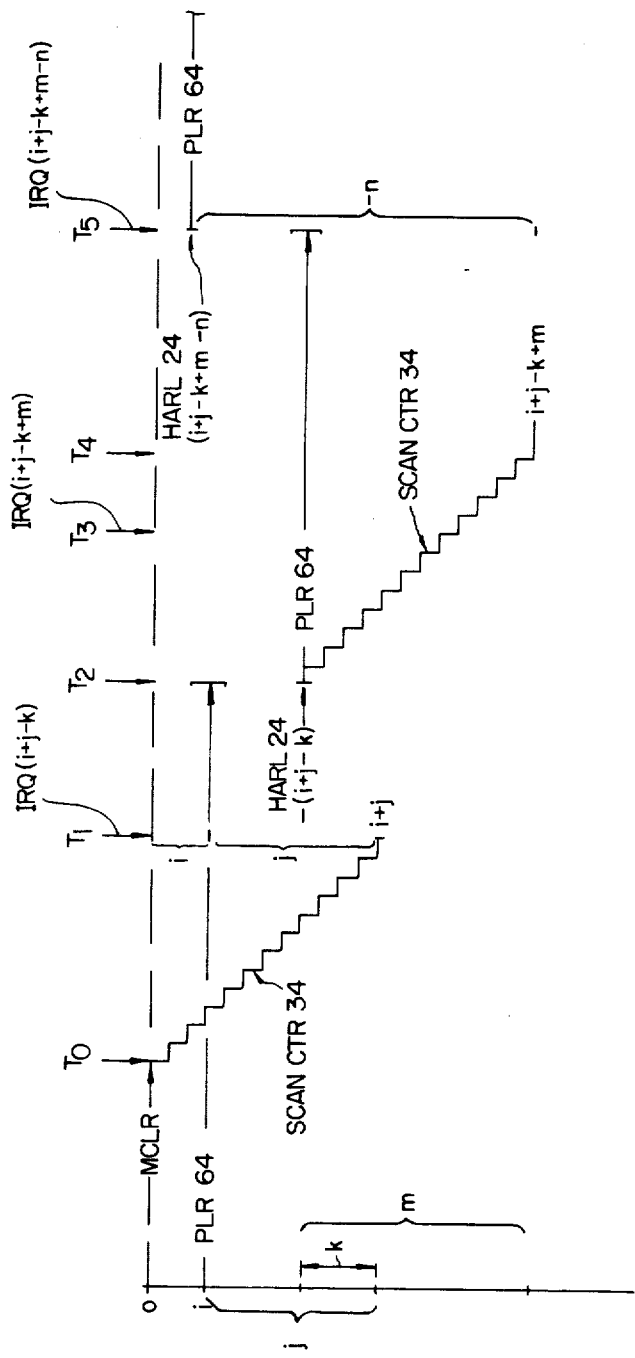
FIG. 2 is an operational state diagram for explaining the action taken by the interrupt controller of FIG. 1 for an exemplary set of interrupt requests.

In order to facilitate an understanding of the operation of the interrupt handling scheme of FIG. 1, attention is directed to FIG. 2 which shows an operational/priority level state chart illustrating the action of the components of the interrupt controller.

At the outset, let it be assumed that the system has been cleared, so that all registers are empty and the scan counter 34 is preset to zero. Moreover, in the description to follow, it will be assumed that the lowest numbered address of the contents of memory 22 corresponds to that memory location which stores the highest priority interrupt level, and the highest numbered address is associated with the lowest priority level interrupt. In the present example, it is assumed that memory 22 is a 1K capacity memory (i.e. a READ/WRITE or RANDOM ACCESS MEMORY), so that memory address zero corresponds to the highest priority interrupt level and memory address 1023 corresponds to the lowest priority interrupt level.

As pointed out above, in accordance with the present invention a prescribed portion of the wide multi-bit address bus is employed for conveying interrupt requests. In the present example, for a 32 bit wide address capability, and with an assignment of up to 1K levels of interrupt, the upper ten bits (bits 22-31) of the address bus have been dedicated for interrupt request handling. These address bits are coupled over link 11 to address level register 13, as described previously.

With a master clear signal have been coupled over link 44 to timing and control unit 41, a scan counter preset signal is applied over line 53 to scan counter 34 to clear or reset the scan counter to zero and to cause the scan counter to initiate counting. The counting cycle is governed by the system clock supplied over input line 45 to control unit 41. At this time, it is assumed that the processor with which the interrupt control unit of FIG. 1 is associated is executing a task having some priority level i, as indicated in the priority level state chart of FIG. 2. In response to a master clear signal on line 44 at time To the scan counter 34 is successively incremented (as shown by the stepped line beginning with the MCLR arrow) causing a successively incremented numerical (address) code to be coupled over link 35 to one input of each of multiplexers 15 and 36. Through an output control signal on link 42, timing and control logic unit 41 causes multiplexer 15 to couple input line 14 to multiplexer output line 21. Also, during the successive incrementing of scan counter 34 timing and control logic unit 41 supplies a signal over line 52 causing multiplexer 36 to couple the contents of the scan counter 34, supplied over link 35, to output line 38 for application to comparator 23. Comparator 23 compares the scan count with the contents of link 14, currently coupled through multiplexer 15 as indicated above, until an interrupt request is located (by the action of scan counter 34) in memory 22, or an interrupt request is received over link 11 having a higher priority than the contents of scan counter 34, causing the output of comparator 23 on line 32 to change state. At this time it will also be recalled that, since the highest active request level register 24 is cleared, the priority level represented by the code contained in program level register 64 exceeds that of the highest active request level register 24, so that the output of comparator 54, on line 55, remains low.

Assume now, that at time T1, scan counter 34 has been incremented to some interrupt address level $i+j$, and an interrupt request (IRQ) having a priority level or address $i+j-k$ is supplied over address bus 11 and loaded into address level register 13. Since output line 14 from register 13 is currently coupled through multiplexer 15 to output link 21, output line 21 is now provided with an address code representative of priority level $i+j-k$ which, as can be seen from FIG. 2, has a priority level greater than the count output of scan counter 34 supplied over link 38. Since the priority level $(i+j-k)$ represented by the contents of register 13 is greater than the count level $(i+j)$ of scan counter 34, comparator 23 provides an output signal over link 32 indicating that the newly received interrupt request (which is loaded into memory 22 via line 21) has a priority level greater than the output of multiplexer 36 on link 38. In response to this output signal from comparator 23, timing and control logic unit 41 supplies a signal over line 48 causing the address code on link 21 to be stored in highest active request level register 24. This new value $(i+j-k)$, which has been loaded into register 24, is coupled over link 33 and is loaded into scan counter 34 under control of a signal on line 53, so that the contents of scan counter 34 are changed from their present address count $(i+j)$ to the value $(i+j-k)$ of the contents of the highest active request level register 24 or, in other words, the count value of scan counter 34 is preset to the value of the address code stored in the highest active request level register 24. The preset control signal on line 53 also inhibits further incrementing of scan counter 34. Thus the contents of scan counter 34 currently coincide with those of highest active request level register 24 and point to that address $(i+j-k)$ in memory where the scan count is to resume in response to that address code being transferred to the processor as an interrupt.

In addition to presetting scan counter 34 at the address code that has been loaded into register 24, timing and control logic unit 41 supplies a signal over link 52 to multiplexer 36 to couple the address code on link 33 over output link 38 to comparator 23. Comparator 23 now compares the contents of highest active request level register 24 with the contents of link 21.

At the same time comparator 54 compares the new value (interrupt priority level $i+j-k$) stored in highest active request level register 24 with the contents of the program level register 64. As shown in FIG. 2, the priority level of the requested interrupt at $(i+j-k)$ is less than that the level (i) at which the processor is currently operating, so that the output of the comparator 54 does not change state and the highest active request level register 24 retains the address code corresponding to interrupt priority level $i+j-k$.

Subsequently, at time T2, the processor completes the execution of the program level i so that the value of the code in program level register 64 is cleared. Comparator 54 now detects that the contents of the highest active request level register 24 exceed those of the cleared contents of the program level register 64, whereby an output is supplied over link 55 to timing and control logic unit 41. In response to this signal, timing and control logic unit 41 supplies a grant enable circuit over line 51 to grant level register 61. This causes the contents (corresponding to interrupt priority level $i+j-k$) of the highest active request level register 24 to be coupled to the grant level register 64, whose contents are now supplied over line 62 to multiplexer 66. Through control line 47, timing and control logic unit 41 causes the address code $i+j-k$ on line 62 to be coupled through multiplexer 66 and interrupt output line 67 to the processor.

Once the processor captures the interrupt it sends an acknowledgement signal over line 58 to timing and control logic unit 41. In response to the acknowledgement signal on line 58, unit 41, via link 48, clears the contents of memory 22 at the storage location identified by the contents of highest active request level register 24. When the processor begins executing the task assigned to interrupt level $i+j-k$, it loads the program level register 64 with the code corresponding to program level $i+j-k$. This causes the output of comparator circuit 54 to change state whereby, in response to the change signal on line 55, timing and control logic unit 41 removes the enable from grant level register 61 via link 51 and, via link 48, clears highest active request level register 24. Also, through link 53, scan counter 34 is caused to begin counting again starting at level $i+j-k$. Scan counter 34 again proceeds to scan through successive memory locations in memory 22 searching for an interrupt that would correspond to the next highest active request to be coupled into register 24. It is still assumed that memory 22 has been cleared, so that the counter continues to scan through empty memory locations.

At time T3, it is assumed that a new interrupt request is supplied over address bus 11 to register 13 and loaded into memory 22 via link 21. The level of this interrupt request is shown as being at a lower level $i+j-k+m$ than the level $i+j-k$ of the task currently being executed by the processor. Moreover, contrary to the situation described above with reference to time T1, here it is assumed that the count value of scan counter 34 corresponds to an address in memory 22 that has a higher priority level than the address code level $i+j-k+m$. As a result, the output of comparator 23 on line 32 does not change and scan counter 34 continues to scan through successive addresses in memory 22. Eventually at time T4, the count value scan counter 34 points to address $i+j-k+m$ that was loaded into memory at time T3. Comparator 23 now changes state, so that the interrupt request $i+j-k+m$ is caused to be placed into the highest active request level 24 and scan counter 34 is preset to the level of the new code $i+j-k+m$ stored in highest active request level register 24 as explained above for the events at time T2. Thus, when scan counter 34 subsequently resumes counting, it is to begin at the new contents of the highest active request level register 24 (i.e. $i+j-k+m$). Since the processor is currently executing a task having a priority level $(i+j-k)$ greater than that $(i+j-k+m)$ indicated by the contents of the highest active request level register 24, the output of comparator 54, on link 55, continues to indicate that the program being executed in the processor has priority over that being requested by the interrupt level stored in the highest active request level register 24.

Referring again to FIG. 2, let it now be assumed that at time T5 there is an additional interrupt request supplied over the address bus 11. The level of this interrupt request is shown as being greater than that of the contents $(i+j-k+m)$ of the highest active request level register 24 and, moreover, greater than that $(i+j-k)$ of the task currently being executed by the processor. The level is designated in FIG. 2 as level $i+j-k+m-n$. Considering again the sequence of events that takes place when an interrupt is coupled over the address bus to register 13 and supplied through multiplexer 15 to link 21 for storage in memory 22, comparator 23 observes that the contents $(i+j-k+m)$ of the highest active request level register 24, as coupled through multiplexer 36 to link 38, correspond to an interrupt priority level less than that $(i+j-k+m-n)$ coupled over link 21. Comparator 23 therefore supplies an output signal on link 32, causing timing and control logic unit 41 to supply a signal over link 48 replacing the code stored in highest active request level register 24 with the new value supplied over link 21. The output of the highest active request level register 24, which now points to the interrupt level $i+j-k+m-n$ is also supplied to the preset inputs of the scan counter 34, so that the scan counter 34, when it resumes counting, will start at a level $(i+j-k+m-n)$ considerably higher than where it left off in response to the receipt of the external interrupt at level $(i+j-k+m)$, described above. Because the previous input request received at time T4 had been stored in the designated location in memory 22, then scan counter 34, once counting again will, eventually, be incremented to address level $i+j-k+m$ (absent an intervening interrupt of a higher priority level).

For the present interrupt level $i+j-k+m-n$, comparator 54 detects that the level $(i+j-k)$ of the task currently being executed by the processor, as indicated by the contents of program level register 64, is less than that $(i+j-k+m-n)$ of the interrupt now stored in highest active request level register 24. Accordingly, comparator 54 supplies an output signal over link 55 to timing and control logic unit 41, causing an enable signal to be supplied over line 51 to the grant level register 61. Also, an output is supplied over link 47 to multiplexer 66, so that the contents of the highest active request level register 24 will be coupled through register 61 and multiplexer 66 to the processor. The new interrupt priority level code for level $(i+j-k-m-n)$, once captured by the processor, is stored in program level register 64. Also, in response to the acknowledgement signal from the processor on line 58, the interrupt flag at address $i+j-k+m-n$ in memory 22 is erased.

The contents of the highest active request level register are then cleared and scan counter 34 begins counting from level $i+j-k+m-n$ looking for the presence of the next highest active interrupt request in memory 22. As pointed out previously, this request currently corresponds to address $i+j-k+m$ and will be eventually encountered as scan counter 34 is successively incremented from its new starting count value corresponding to address $i+j-k+m-n$ to the currently highest interrupt flag address $i+j-k+m$ in memory 22. At that time, highest active request level register 24 is again loaded with the address code for interrupt priority level $i+j-k+m$, counter 34 is preset to that value, and that value is again continuously compared with the level of task being executed by the processor as stored in register 64, as explained above.

As will be appreciated from the foregoing description, the interrupt handling scheme according to the present invention provides a mechanism for processing interrupts that offers both speed and flexibility. Through the use of the highest active request level register interrupts are effectively prefetched for consideration by the processor. The scanning of interrupt request memory 22 by scan counter 34 in order of interrupt priority level guarantees that the interrupt that is next in line for service by the processor (i.e. that stored in highest active level register 24) has the highest priority of all interrupt requests awaiting service. The use of a portion of the address bus simplifies system architecture and enables the interrupt request priority level of any module to be changed simply by changing its address.

While I have shown and described an embodiment in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are obvious to one of ordinary skill in the art.

What is claimed:

1. For use with a data processing system wherein interrupt requests for service by a processing device are transmitted over a processor communication link, each interrupt request having a prescribed level of priority, an arrangement for controllably coupling interrupt requests to said processing device comprising:
    random access memory means, coupled to said processor communication link and having a plurality of addressable storage locations, for storing, sequentially in time, interrupt requests supplied over said communication link in accordance with the order in time that said requests are supplied thereto and in memory address locations associated with the respective levels of priority of said requests;
    memory address scanning means, coupled to said random access memory means, for scanning the storage locations of said random access memory means to locate a stored interrupt request whose priority level among requests stored by said random access memory means is highest;
    register means for controllably storing an interrupt requests; and
    comparison means, coupled to said processing device and to said register means, for comparing the contents of said register means with the level of task execution activity of said processing device and, upon detecting the level of task execution activity of said processing device to be less than the priority level as represented by the contents of said register means, causing the contents of said register means to be forwarded to said processing device as an interrupt request.

2. An arrangement according to claim 1, wherein said memory address scanning means includes means for coupling a located interrupt request from said memory means to said register means, whereby the contents of said register means represent the priority level of said located interrupt request.

3. An arrangement according to claim 2, wherein memory address scanning means comprises means for controllably generating successive address signals through which said plurality of storage locations of said random access memory means are successively accessed and means for controllably causing said address signals to be supplied to said memory means.

4. An arrangement according to claim 2, wherein said memory address scanning means includes means for interrupting the generation of said successive address signals upon locating that stored interrupt request whose priority level among requests stored by said random access memory means is highest.

5. An arrangement according to claim 4, wherein said memory address scanning means includes means for causing said successive address signals generating means to resume the generation of successive address signals starting from that address associated with the contents of said register means in response to said comparison means causing the contents of said register means to be forwarded to said processing device.

6. An arrangement according to claim 3, wherein said memory address scanning means includes means for interrupting the generation of said successive address signals in response to an interrupt request being stored in said register means.

7. An arrangement according to claim 6, wherein said memory address scanning means includes means for causing said successive address signals generating means to resume the generation of successive address signals starting from that address associated with the contents of said register means in response to said comparison means causing the contents of said register means to be forwarded to said processing device.

8. An arrangement according to claim 1, wherein said memory address scanning means further comprises comparator means, coupled to said register means and to said processor communication link, for comparing the contents of said register means with the priority level of an interrupt request supplied over said processor communication link, and causing an interrupt request that has been supplied over said processor communication link to be stored in said register means in response to the level of priority of said supplied interrupt request exceeding the level of interrupt request priority as represented by the contents of said register means.

9. An arrangement according to claim 8, wherein said memory address scanning means comprises means for controllably generating successive address signals through which said plurality of storage locations of said random access memory means are successively scanned and means for controllably causing said address signals to be supplied to said memory means.

10. An arrangement according to claim 9, wherein said memory address scanning means includes means for interrupting the generation of said successive address signals in response to an interrupt request being stored in said register means.

11. An arrangement according to claim 1, wherein said processor communication link comprises a selected portion of an address link portion of the system communication bus.

12. An arrangement according to claim 2, wherein said comparison means includes means, coupled to said random access memory means, for controllably erasing said located interrupt request from said random access memory means in response to the completion of forwarding of the contents of said register means to said processing device.

* * * * *